United States Patent [19]

Troxell

[11] Patent Number: 5,223,008
[45] Date of Patent: Jun. 29, 1993

[54] HORIZONTALLY MOUNTED FILTER CARTRIDGE DUST COLLECTOR

[75] Inventor: Ronald C. Troxell, Schaumburg, Ill.

[73] Assignee: Flex-Kleen Corp., Itasca, Ill.

[21] Appl. No.: 934,424

[22] Filed: Aug. 24, 1992

[51] Int. Cl.$^5$ .............................................. B01D 46/24
[52] U.S. Cl. .......................................... 55/350; 55/302;
   55/429; 55/502; 55/493; 55/504; 55/508
[58] Field of Search ................ 55/302, 341.1, 350,
   55/374, 378, 429, 493, 494, 495, 504, 508, 502,
   341.4

[56] References Cited

U.S. PATENT DOCUMENTS

| | | | |
|---|---|---|---|
| 3,733,784 | 5/1973 | Anderson et al. | 55/117 |
| 3,733,785 | 5/1973 | Gallaer | 55/129 |
| 3,831,350 | 8/1974 | Gilles et al. | 55/128 |
| 3,910,779 | 10/1975 | Penney | 55/124 |
| 3,990,871 | 11/1976 | Cooper | 55/129 |
| 4,026,683 | 5/1977 | Snader et al. | 55/108 |
| 4,213,766 | 7/1980 | Wyatt | 55/2 |
| 4,343,632 | 8/1982 | Margraf | 55/341 |
| 4,395,269 | 7/1983 | Schuler | 55/302 |
| 4,435,197 | 3/1984 | Nijhawan et al. | 55/341 |
| 4,486,204 | 12/1984 | Marijnissen et al. | 55/267 |
| 4,504,293 | 3/1985 | Gillingham | 55/350 |
| 4,544,383 | 10/1985 | Haselmaker | 55/129 |
| 4,650,504 | 3/1987 | Howeth | 55/498 |
| 4,695,297 | 9/1987 | Hein | 55/112 |
| 4,820,320 | 4/1989 | Cox | 55/302 |
| 4,871,380 | 10/1989 | Meyers | 55/350 |
| 4,883,509 | 11/1989 | Giusti | 55/326 |
| 4,883,510 | 11/1989 | Giusti | 55/326 |
| 4,968,330 | 11/1990 | Wolf et al. | 55/112 |
| 5,024,681 | 6/1991 | Chang | 55/6 |

FOREIGN PATENT DOCUMENTS 2088744A 6/1982 United Kingdom.

OTHER PUBLICATIONS

Torit Dust Collectors, Donaldson Company, Inc., product literature 1986.
Dust Hog Dust Collection Systems, United Air Specialists, Inc., product literature 1991.
Fabricmax Cartridge Filter Dust Collectors, product literature.
Sternvent Sternpulse Self Cleaning Cartridge Dust Collectors, Sternvent Co., product literature.
Murphy-Rodgers Model MRWH Cartridge Type Collectors, Murphy-Rodgers, Inc., product literature, May 1, 1991.
Polaris Horizontal Cartridge Dust Collectors, Polaris Industrial Ventilation Co., product literature.

*Primary Examiner*—Charles Hart
*Attorney, Agent, or Firm*—Howrey & Simon

[57] ABSTRACT

A horizontally mounted filter cartridge dust collector includes a housing and a plurality of filter cartridges horizontally mounted in rows on a cartridge cradle disposed inside the housing for supporting the cartridges. The cartridge cradle includes a plurality of vertical risers and horizontal tubes attached between the risers and an inner wall of the housing separating the dirty and clean air plenums. A single access door facilitates inspection and servicing of all of the filter cartridges and the entire dirty air plenum. Pairs of studs attached to the inner wall mate with corresponding grooves in the cartridge end caps to precisely locate the horizontal and vertical positions of the cartridges. Clamping mechanisms are provided to compress and seal each row of cartridges to isolate the clean and dirty air plenums. Each clamping mechanism includes a rotatable shoe for isolating the cartridges and gasket seals from torque being applied to operate the clamping mechanism.

20 Claims, 7 Drawing Sheets

HORIZONTALLY MOUNTED FILTER CARTRIDGE DUST COLLECTOR

BACKGROUND OF THE INVENTION

The invention relates to filter cartridge dust collectors, and in particular to a horizontally mounted filter cartridge dust collector and support system therefor, which is internal to the housing of the collector and external to the cartridges. The support system permits the use of a single access door through which all of the cartridge rows may be accessed and an improved clamping mechanism for compressing and retaining the cartridges in place.

A variety of different air filter systems exist which use different types and orientations of filter elements, such as baghouses in which filter bags typically are vertically disposed (as shown, for example, in U.S. Pat. No. 4,435,197 to Nijhawan et al.) and dust collectors which use horizontally mounted filter tubes or bags (as shown, for example, in U.S. Pat. No. 4,343,632 to Margraf). Horizontally mounted, cylindrical pleated cartridges are another common type of filter element, such as disclosed in U.S. Pat. No. 4,050,504 to Howeth.

A number of different cartridge support and housing structures have been employed for horizontally mounted filter cartridges. Typically, the horizontally mounted filter cartridge systems utilize a separate access door for each cartridge or row of cartridges, as evidenced by the TORIT, FABRICMAX, DUST-HOG, and STERNPULSE dust collectors marketed, respectively, by the Donaldson Co., PTS Industries, United Air Specialists, and the Sternvent Co.

The TORIT System includes a number of horizontally mounted filter cartridges supported inside the housing using an internal truss-like structure or yoke, which extends from the tube sheet to the front plate of the housing. The front plate includes a number of holes for mounting the individual cartridges. In such an arrangement, the front plate and tube sheet provide support for the ends of the filter cartridges, while the internal truss structure supports the interior of the cartridges, which may be arranged in rows of multiple in-line cartridges supported by the truss.

This type of support system has a number of drawbacks and disadvantages—for instance, the separate access door for each cartridge or row of cartridges. With separate doors, servicing of the cartridges and inspection of the system is difficult because the single row access doors do not allow for visual inspection of other cartridge rows, nor of the interior of the dirty air plenum. Thus, in the event of a cartridge failure, each individual cartridge row may have to be removed to find the faulty cartridge. A further disadvantage of such system is the high manufacturing and labor costs necessitated because of the need to cut and machine multiple access holes, and fabricate and mount the individual doors.

Another problem that exists in such filter cartridge systems is that the use of the internal truss support structure can result in cartridge instability, which may cause improper sealing of the cartridges. A tight fit between the truss and the cartridge is difficult to achieve due to the required tolerance with the inner diameter of the cartridge. As a result, there often exists a certain amount of play or looseness between the truss structure and the cartridges. Consequently, the cartridges are unstable and may become misaligned, especially during compression of the cartridges, thereby resulting in defective sealing.

Clamping mechanisms and gaskets have been frequently used to provide the requisite compression and sealing of the cartridges. For example, the TORIT system utilizes a handle, an access cover and a gasket to compress and seal the cartridges. Rotation of the handle applies pressure from the access cover to the cartridge to compress the gaskets disposed between the cover and the outer cartridge, between the cartridges themselves, and between the inner cartridge and the tube sheet. The problem with this type of cartridge clamping mechanism is that by turning the handle torque may be applied to the access cover. This can result in undesired twisting of the access cover, cartridges (due to their loose support on the internal yoke), and/or the gaskets, which may produce misalignment or damage to the gaskets. Either of these two conditions greatly increase the risk of improper sealing and possible leakage of dirty air into the clean air chamber, which decreases performance of the system.

U.S. Pat. No. 4,650,504 to Howeth discloses a different type of clamping mechanisms that may be used in a filter system having horizontally mounted filter cartridges (FIG. 3) or vertically mounted filter cartridges (FIG. 5). In the horizontally mounted system, turning of a threaded bolt axially moves a gimbal plate along tension bars to compress an end seal. Again, this arrangement may produce the undesirable application of torque to gimbal plate, seal and cartridge. Similarly, the clamping mechanism for vertically mounted cartridges includes a bolt threaded through a clamping bar. Rotation of the bolt axially compresses a gimbal plate and a gasket via a cylindrical sleeve connected to gimbal plate. Undesirable torque may be transmitted to the gimbal plate, seal, and cartridge by the sleeve.

U.S. Pat. No. 4,871,380 to Meyers discloses a cartridge clamping mechanism (FIG. 5) which accomplishes the requisite compression sealing by means of a spring loaded clamping plate instead of the usual threaded rod. This type of clamping mechanism still requires the use of some rotational force, which may impart undesired torque, and introduces the use of an additional element—a compression spring—that is susceptible to wear.

Horizontally mounted filter cartridge systems having a single door providing access to a bank of filter cartridges are known from the patent literature, but have not been widely commercialized. U.K. Patent Application GB 2088744 discloses an air filter system that includes two banks of filter cartridges mounted horizontally on support structures disposed inside the housing. A single door provides access to each bank of cartridges. However, each row of the cartridge in a bank contains only a single cartridge. Because the depth of the system is only one cartridge per row, such a system has a limited capacity.

U.S. Pat. No. 4,871,380 to Meyers discussed above discloses a dust collector having cartridge rows of two in-line cartridges. These cartridges are mounted in a cage on three rods, which are external to the cartridges. However, Meyers does not provide a single access door, but instead suffers from disadvantages discussed above associated with the use of multiple access holes and doors.

More recently, horizontally mounted cartridge filter systems having a single door providing access to rows of multiple in-line cartridges have become available. Examples of such systems include the MRWH Series Cartridge Type Collectors, and the INTERCEPT Horizontal Cartridge Dust Collectors, available from Murphy-Rogers, Inc. and Polaris Industrial Ventilation, Inc., respectively. The MRWH Cartridge Type Collector includes horizontally mounted filter cartridges which may be mounted in rows having two cartridges each. The MRWH system is believed to include an internal structure for supporting the cartridges similar to the truss structure described in the TORIT system above. Thus, this system also suffers from the drawbacks of having loosely mounted cartridges, with the resultant cartridge instability, misalignment, and sealing problems.

The foregoing demonstrates a need for a horizontally mounted filter cartridge dust collector having a single access door and a cartridge support system that provides stable support for rows of multiple in-line cartridges. There is also a need for a clamping mechanism to compress and seal the cartridges in a filter cartridge dust collector of any type that prevents misalignment and improper sealing of the cartridges and gaskets.

SUMMARY OF THE INVENTION

The filter cartridge dust collector of the invention meets these needs and overcomes the disadvantages and drawbacks of the prior art by providing a cartridge cradle or support structure that is external to the cartridges, can support rows of multiple in-line cartridges, and enables the use of a single door. The single access door facilitates cartridge servicing and internal inspection of the housing because access is available to all of the cartridges and the entire dirty air plenum. In the event of a cartridge failure, all of the cartridges can be examined while mounted on the cartridge cradle inside housing and the cartridges need not be removed for visual inspection of the cartridge rows. The use of a single access door also reduces fabricating and manufacturing costs because only one access opening must be provided in the housing and only one door must be fabricated and mounted thereto. The cartridge cradle is internal to the housing and external to the cartridges for providing improved cartridge support for rows of multiple in-line cartridges. A mating connection of cartridge alignment studs provided in the housing with the innermost cartridges provides for improved cartridge stability and alignment of all cartridges in a row. A clamping mechanism, utilizable with horizontal, vertical or other filter cartridge orientations, is provided to compress and seal the cartridges while isolating the cartridges and the gasket seals from torque applied to operate the clamping mechanism, thereby obviating the attendant misalignment and improper sealing problems of the prior art.

More particularly, the filter cartridge dust collector of the invention includes a housing divided into clean and dirty air plenums by an internal partition. The cartridge cradle is located within the dirty air plenum for externally supporting rows of horizontally mounted, in-line filter cartridges. The cartridge cradle includes a plurality of spaced, generally vertical supports each coupled to the housing structure, and a plurality of spaced, generally horizontal supports connected between the vertical supports and the internal partition for supporting the cartridges. Alignment studs or projections extending from the partition are matingly received in recesses provided in the end of the inner cartridges adjacent the partition. The horizontal supports and projections precisely locate the horizontal and vertical position of the inner cartridges. All of the cartridges in each row are maintained in such proper alignment after being compressed by the clamping mechanism. The clamping mechanism includes a rotatable shoe axially coupled to a threaded shaft, which linearly moves a clamping disc or plate to compress the cartridges and gasket seals. The shoe is rotatable about the end of the shaft to isolate the cartridges and gaskets from transmission of torque from the clamping plate, thereby minimizing the risk of improper sealing due to cartridge or gasket misalignment and/or wear.

DETAILED DESCRIPTION

Figure 1:
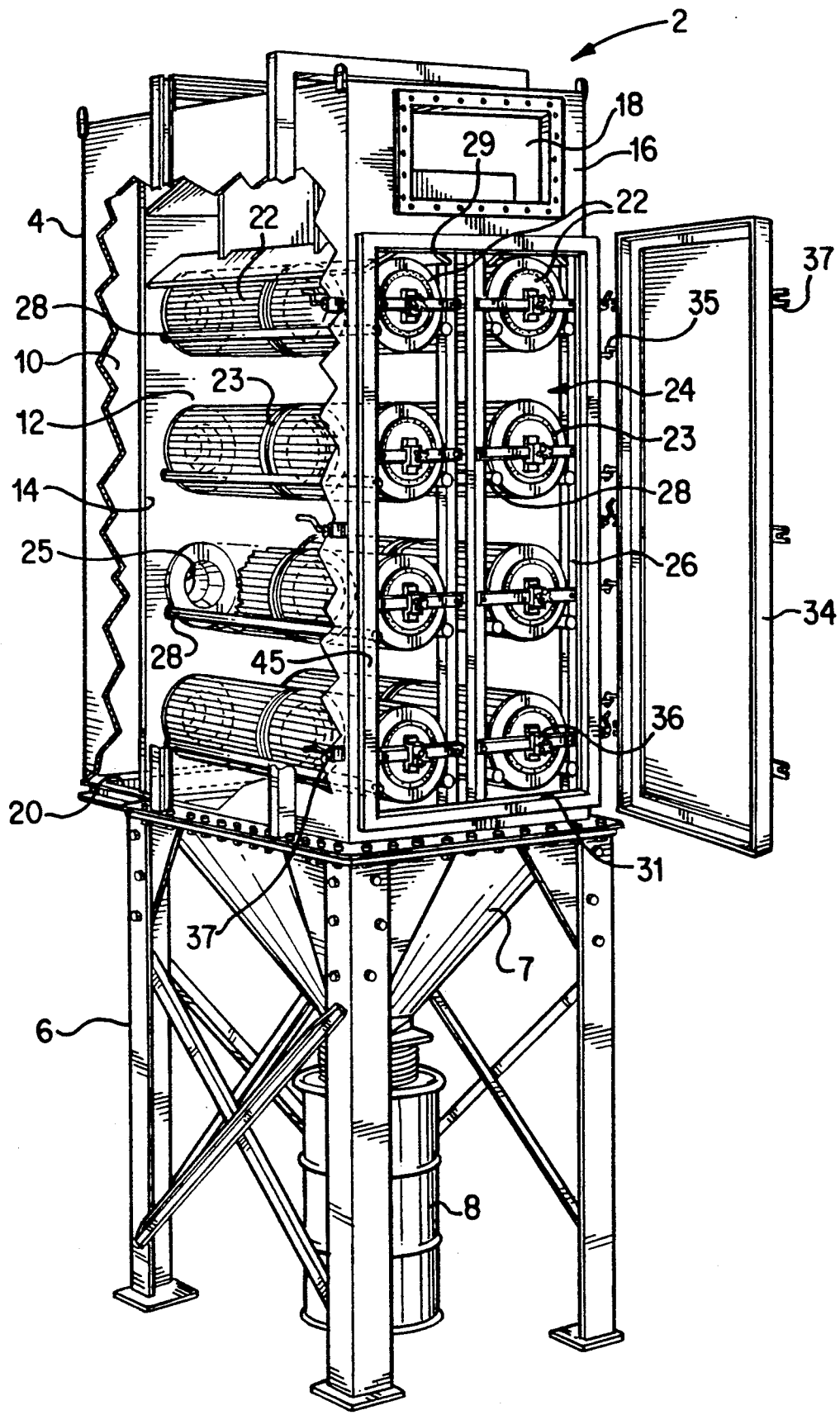
FIG. 1 is a perspective view, partially cut-away, of horizontally mounted filter cartridge dust collector constructed according to the principles of the invention.
Figure 2:
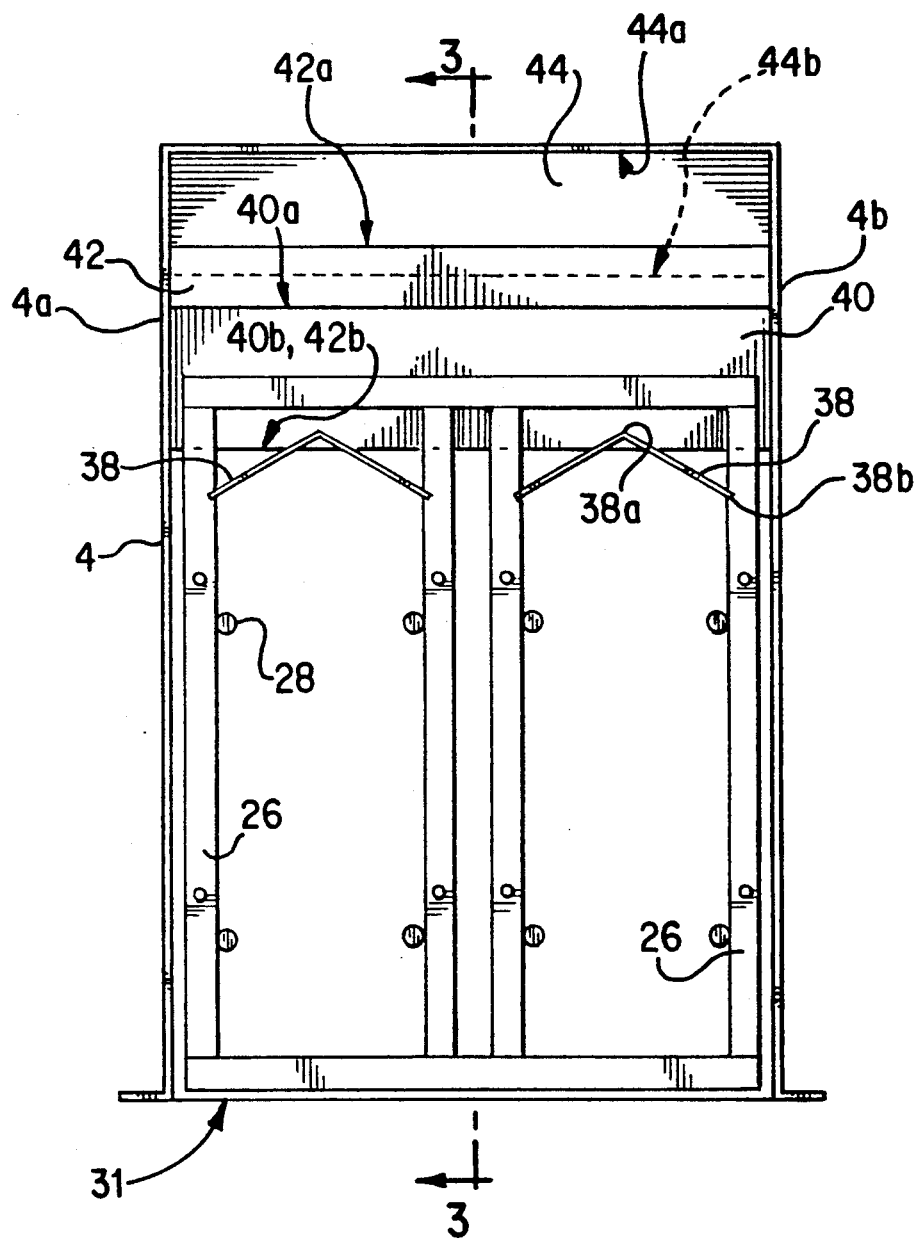
FIG. 2 is a front view of the dust collector shown in FIG. 1 with the single access door, filter cartridges and clamping mechanisms removed.
Figure 3:
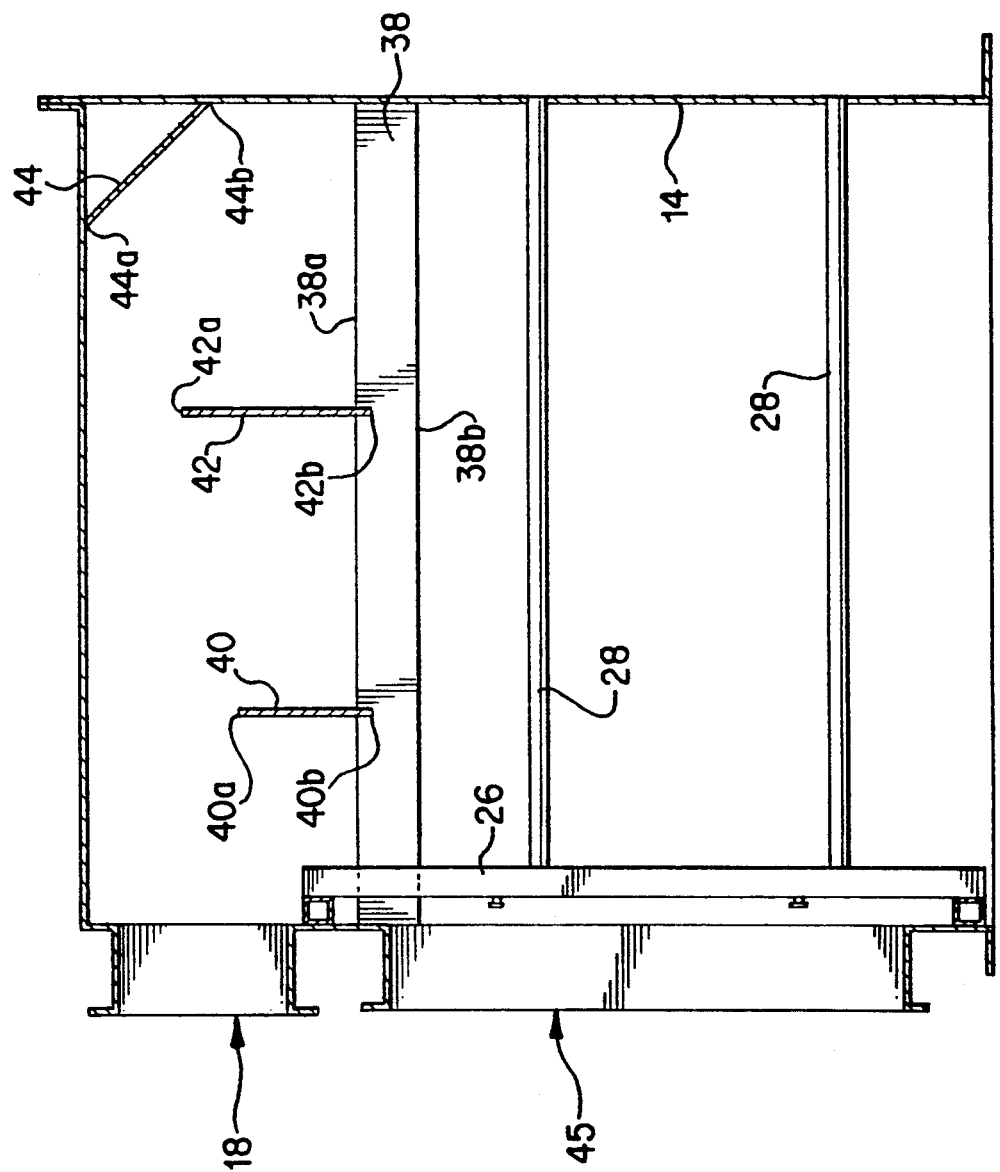
FIG. 3 is a sectional view taken along line 3-3 of FIG. 2, in which the clean air plenum been removed.

Referring to the drawings in detail, wherein like numerals indicate like elements, FIGS. 1-3 show the overall structure of a horizontally mounted filter cartridge dust collector 2 constructed according to the principles of the invention. Collector 2 includes a housing 4, legs 6 attached to the housing, hopper 7 and a drum 8 for receiving debris or particles filtered from the process air. A tube sheet 14 divides housing 4 into a clean air plenum 10 and dirty air plenum 12. A plurality of apertures in tube sheet 14 allow air filtered by the cartridges to enter the clean air plenum 10. Process air to be filtered enters the dirty air plenum via inlet 18 located in an upper portion of front housing sheet 16, while filtered air exits clean air plenum 10 via outlet 20 located at the bottom side of housing 4.

Two banks of air filter cartridges 22 are mounted in dirty air plenum 12 for removing dust particles and the like from the process air. The banks of cartridges are arranged in two columns of four cartridge rows each, wherein each cartridge row preferably includes at least two horizontally mounted in-line cartridges. The multiple in-line cartridge row arrangement, as shown in FIG. 1, allows for increased filtering capacity over single cartridge depth arrangements. The cartridge rows may be more than two cartridges deep and more than two columns of cartridge rows may be employed. The filter cartridges 22 preferably are cylindrical and pleated to provide increased filtering surface area.

As shown in FIGS. 1-3, a cartridge cradle 24 is mounted in the dirty air plenum 12 and supports filter cartridges 22 inside housing 4. Cradle 24 comprises vertical risers 26 and horizontal tubes 28. Cartridge cradle 24 is internal to the housing 4 and external to the filter cartridges 22. Filter cartridges 22 securely rest on horizontal tubes 28, which prevent lateral and downward vertical movement of the cartridges. Vertical risers 26 may be attached to housing 4 by welding or other means and extend vertically from the top 29 to the bottom 31 of access door frame 45 as shown in FIGS. 1 and 2. There is a vertical riser 26 on either side of both filter cartridge columns, but a single riser between the two columns could be used instead. Vertical risers 26 may be formed of square steel tubes, but any suitable material and shape may be used. Horizontal tubes 28 are connected to the vertical risers 26 through welding or other known methods, and extend horizontally from the vertical risers 26 to the tube sheet 14, where they are similarly attached. Horizontal tubes 28 may be formed form round tubular steel pipes, but any suitable shape and material may be used.

The pair of cartridges in each row are supported in the cradle tubes 28 by abutment along two lines of contact at the external surface of the cartridges. In this manner, the lateral position of the cartridges are fixed irrespective of variances in the diameters of the filters. Gaskets 23 are provided at each cartridge end, i.e., between the tube sheet 14 and the adjacent inner cartridges, between any adjacent cartridges when an inline multiple cartridge arrangement is used, and between the outer cartridges located nearest the access door frame 45 and clamping mechanisms 36. Clamping mechanisms 36 operate to compress and secure the cartridges in place, as well s the gaskets 23 to create the requisite air tight seals. Clamping mechanisms 36 are discussed in greater detail below.

Dust collector 2 is equipped with a single access door 34 attached to access door frame 45 through the use of one or more conventional hinges 35. Access door frame 45 defines a single opening in the front sheet 16 of the housing that provides access to all of the cartridges and the entire dirty air plenum 12. In its closed position, access door 34 covers all of the filter cartridges 22 mounted on cartridge cradle 24, and may be locked using one or more locking or similar devices 37.

FIGS. 2 and 3 illustrate ladder vanes 40, 42 and deflector vane 44, which are located inside the dirty air plenum to evenly distribute the flow of the incoming air stream via inlet 18 across the entire depth, i.e., along the longitudinal dimension, of the cartridges. Ladder vanes 40 and 42 are formed of rectangular shaped sheets of metal having top and bottom edges 40a, 40b and 42a, 42b, respectively. Vanes 40, 42 extend the full width of the plenum 12 as shown in FIG. 2 and may be attached to the inner surfaces of the sides of the housing 4a, 4b by welding or other means. The bottoms 40b, 42b of the ladder vanes 40 and 42 are received in recesses in diverter plates 38, discussed below, as shown in FIG. 3. Ladder vane 40 is located closest to the process air inlet 18 and extends upwardly to deflect the lowermost portion of the incoming air flow to the cartridges or cartridge portions located nearest the dirty air inlet 18. Ladder vane 42 is located further in the housing 4 (closer to the tube sheet 14) than ladder vane 40, and has a height that is greater than ladder vane 40. Thus, vane 42 deflects a portion of the upper air stream not deflected by vane 40 into the middle portions of the cartridges. Deflector vane 44 is a rectangular sheet of metal tilted at an angle, such has 45 degrees, as shown in FIG. 3 and is located on the upper rear portion of the dirty air plenum. It has a length which may extend across the full width of the housing 4 between sides 4a, 4b. Deflector vane 44 has a top edge 44a which is attached to the inside of the top of housing 4, and a bottom edge 44b attached to the tube sheet 14. The bottom 44b of ladder vane 44 is disposed above the top 40a of ladder vane 40 and below the top 42a of ladder vane 42. Similar to ladder vanes 40 and 42, deflector vane 44 acts to direct the uppermost portion of the undeflected air flow into the back end of the cartridge banks.

Diverter plates 38 are located inside housing 4 below the ladder vanes and are formed of V-shaped sheets of metal for smoothly directing the incoming air stream around the uppermost row of cartridges to distribute the air flow to the lower positioned cartridges of each column. Diverter plates 38 also protect the uppermost cartridge rows from direct impingement and abrasion from the incoming dust. Diverter plates 38 are positioned directly above each column of cartridges, and extended longitudinally the full length of the cartridge rows, i.e., from the vertical risers 26 to the tube sheet 14, and may be attached therebetween. Plates 38 have a width sufficient to cover each column of cartridges. Each diverter plate 38 includes a top edge 38a and two bottom edges 38b After the process air containing particles or debris enters dirty air inlet 18 and is distributed by vanes 40, 42, and 44, it is directed around the uppermost cartridges in each column. In addition to distributing the air to sides of the cartridge rows, diverter plates tend to force larger particles out of the air flow where they fall downwardly due to gravity, pass through hopper 7, and are caught in drum 8. In this manner, these larger particles are less likely to clog the uppermost cartridges of each column, thereby increasing the filtering capacity of the system.

In operation of the collector 2, incoming air is pulled or pushed through air inlet 18 into the dirty air plenum 12 using a fan and motor assembly as is conventional in the art. The incoming air stream is evenly distributed along the length of filter cartridges 22 by ladder vanes 40 and 42, which, as discussed above, are of different heights to permit decreasing amounts of air to flow past the vanes. Any air flowing past both vanes 40, 42 is deflected downwardly by the deflector vane 44. Vanes 40, 42, and 44 operate to turn the incoming air downwardly toward the filter cartridges where the air is then distributed laterally across the width of the cartridges toward the lower cartridge rows by diverter plates 38, as discussed above. Dust and other particles are collected on the outside of the filter cartridges 22 as the air passes into the interior of the cartridges in a manner known in the art. The filtered air then enters the clean air plenum 10 via apertures 25 in tube sheet 14. The filtered air exits the clean air plenum via the air outlet 20. During operation, the filter cartridges may be periodically and automatically cleaned without removal through the use of pulses of reverse air flow in a manner that is well known in the art, but forms no part of the present invention.

Figure 4:
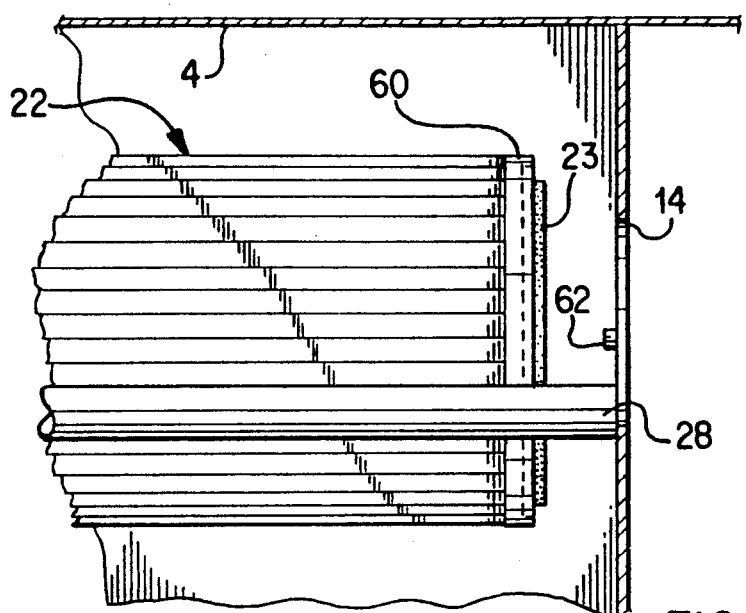
FIG. 4 is a side view of a filter cartridge and part of the cartridge support system of the invention taken from inside the housing.
Figure 5:
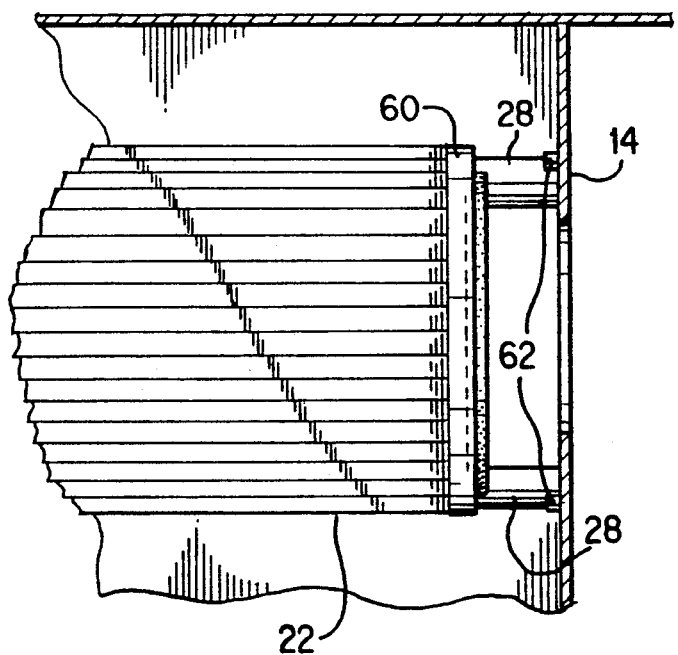
FIG. 5 is a plan view of the filter cartridge and cartridge support shown in FIG. 4.
Figure 6:
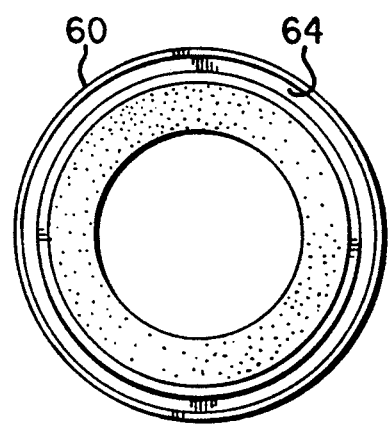
FIG. 6 is a front view of a filter cartridge end cap constructed according to the principles of the invention.

FIGS. 4–6 show details of the part of cartridge support system that precisely locates and maintains the cartridges in fixed positions within the housing. As discussed above, the filter cartridges 22 are supported in fixed lateral positions by horizontal tubes 28, which are attached to tube sheet 14 and vertical supports 26. Each cartridge 22 includes end caps attached to open ends of the filter cartridge in a manner known in the art. The ends of the cartridge adjacent to the tube sheet 14 are provided with specially designed end caps 60 having a circumferential groove 64 to snugly receive one or more stud members 62, thereby fixing the vertical position of the cartridge. A gasket 23 is positioned between the end cap 60 and tube sheet 14 to provide an air tight seal therebetween. Stud members 62 may be attached by welding or other known means to the dirty air plenum side of tube sheet 14. FIG. 6 shows the groove 64 formed in the outer surface of end cap 60, which faces tube sheet 14. Groove 64 has a width and depth selected to tightly receive studs 62, thereby preventing movement of the cartridge in two directions (vertical and horizontal). Instead of a groove, other depressions such as slots, holes, etc., may be used to matingly receive the stud members.

When installing filter cartridges 22 into housing 4, the innermost cartridge of each row is placed onto the horizontal tubes 28 and pushed backward until gasket 23 contacts tube sheet 14 and studs 62 are inserted into groove 64 of cartridge end cap 60. Additional in-line cartridges may then be loaded onto tubes 28 in each row and a clamping mechanism is then used to tightly compress the cartridges and adjacent gaskets, thereby fixing the cartridges in place and providing proper sealing between the dirty and clean air plenums. Each row of cartridges includes a set of studs 62 on the tube sheet 14 which mate with an end cap groove 64. Because the fit between studs 62 and groove 64 is snug and all of the cartridges in each row are compressed together, studs 62 and grooves 64 prevent cartridge movement and misalignment both horizontally (side-to-side) and vertically (top-to-bottom). Thus, even though only one cartridge in each row may have a stud-groove arrangement, all of the cartridges in each row are securely held in fixed horizontal and vertical positions because of the surface tension provided by clamping mechanism, which compresses all of the cartridges in a row together to act as a unit. Any number of studs may be used, but it is preferred that at least two diametrically opposed studs be used to inhibit any rotational movement of the cartridge as well. Preferably, and due to compressive force plated on the cartridges by the clamping mechanism, only the inner cartridges directly adjacent the tube sheet 14 need to be precisely located in fixed horizontal and vertical positions by the stud-groove arrangement. However, all of the cartridges could be manufactured to contain a groove 64 or the like in one or both of the end caps to facilitate manufacture and/or interchangeability of cartridges.

Figure 7:
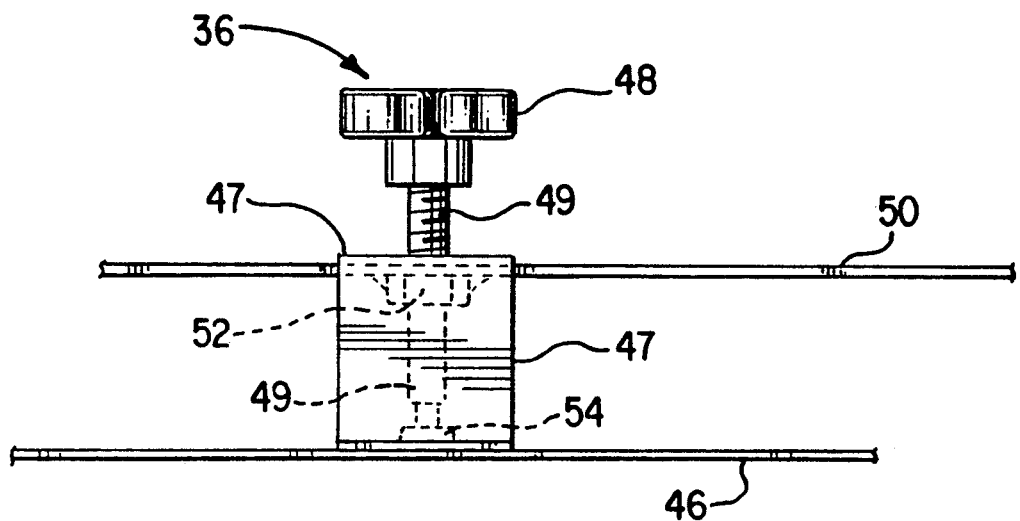
FIG. 7 is an elevational view of a clamping mechanism constructed according to a first embodiment of the invention.
Figure 8:
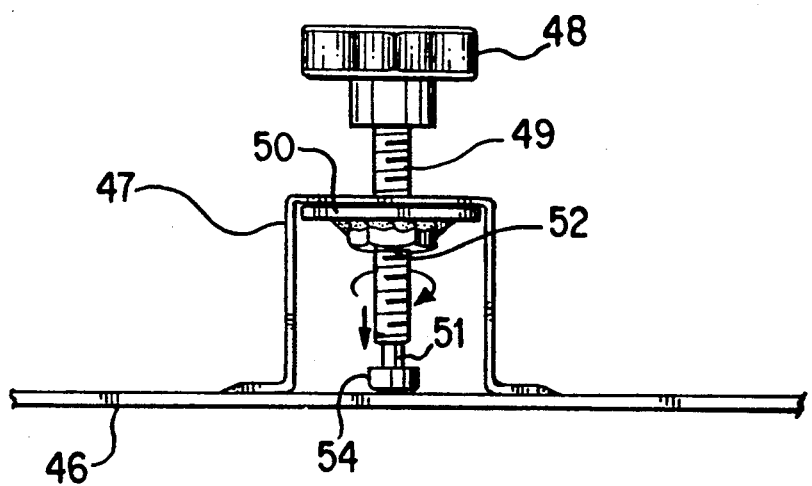
FIG. 8 is an elevational view of the clamping mechanism shown in FIG. 7 rotated 90 degrees.
Figure 9:
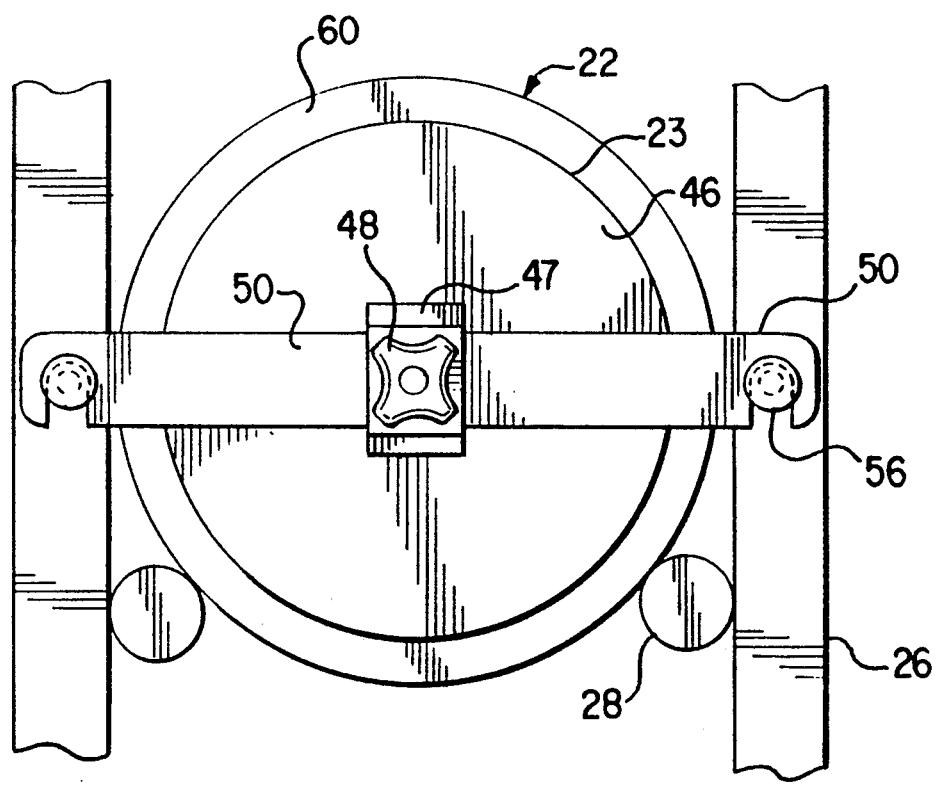
FIG. 9 is a front view of the clamping mechanism shown in FIG. 7, coupled to a cartridge and the cartridge support system of the invention.

Referring to FIGS. 1, 7-9, the clamping mechanism 36 of the invention includes a clamping plate or disc 46, which may be a circular plate located adjacent the open, outer end of the outermost filter cartridge 22 of each row. A gasket 23 is compressed between each end cap 60 and clamping disc 46 to seal the outboard ends of the cartridges. Gasket 23 may be annular and formed from any conventional sealing material known in the art. A mounting bracket 47, which may be U-shaped, is attached to clamping disc 46 through welding or other technique as shown in FIG. 8, and forms a stop limiting the travel of disc 46 as discussed below. A clamping bar 50 provided for each cartridge row is attached to the vertical risers 26 in a position overlying the vertical midpoint of each cartridge row using shoulder studs 56 or other suitable fasteners, such as bolts and nuts. A threaded opening 52 is located at the center of clamping bar 50. The threaded opening 52 may be provided, for example, by a threaded nut welded to the back of clamping bar 50, as shown in FIG. 8. Threaded shaft 49 is inserted through a hole in mounting bracket 47 and is received in threaded opening 52 of the clamping bar 50. A handle 48 is attached to the outer end of the threaded shaft 49 to facilitate rotation of shaft 49 and provide for movement of shaft 49 relative to clamping bar 50. A shoe 54 is axially mounted on the inner, non-threaded end 51 of shaft 49 for rotation relative to shaft 49 in a manner discussed in detail below.

Figure 10:
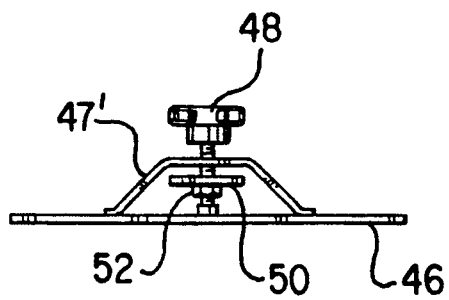
FIG. 10 is an elevational view of a clamping mechanism constructed according to a second embodiment of the invention.

Clamping mechanism 36 operates to apply pressure to the clamping disc 46 to compress the cartridges 22 and gaskets 23 in each row to provide the requisite sealing of the cartridges. In operation, threaded nut 52 and clamping bar 50 remain stationary because they are attached to vertical risers 26. Handle 48 is rotated to move the shaft 49 such that the rotatable shoe 54 comes into contact with clamping disc 46. Further rotation of handle 48 results in movement of clamping disc 46 toward the cartridges and gaskets. The handle is rotated sufficiently to compress the gasket 23 between clamping disc 46 and the end of the outer cartridge, as well as the other gaskets and cartridges, to provide airtight seals. Bracket 47 travels with the disc 46 and moves toward the clamping bar 50 as the handle is rotated to compress the cartridges and gaskets. Once the bracket 47 abuts the clamping bar, a stop position is reached as illustrated in FIGS. 7–8 and no further inward movement is possible. FIG. 10 shows a slightly modified clamping mechanism in which the mounting bracket 47' has a wider angle between its sides than the bracket of FIGS. 7–9. In FIG. 10, an intermediate adjustment position is illustrated as the full travel of the shaft 49 has not yet been achieved (bracket 47' is spaced from the clamping bar 50). Therefore, a tighter adjustment of the clamping mechanism shown in FIG. 10 is possible.

Figure 11:
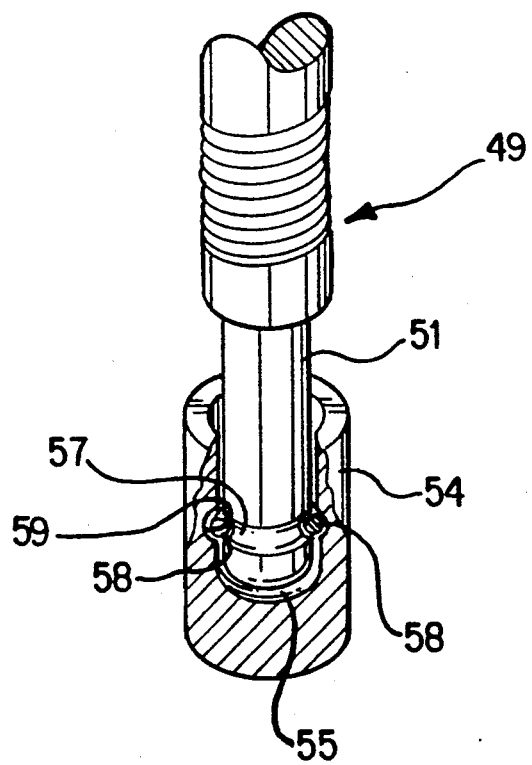
FIG. 11 is a partial sectional view showing the interconnection between the shaft and rotatable shoe of the clamping mechanism of the invention.

During the adjustment of clamping mechanism 36, rotatable shoe 54 prevents the shaft 49 from applying torque to clamping disc 46. Torque delivered to the disc 46 could result in misalignment of the cartridges and gaskets and/or damage to the gaskets, thereby causing improper sealing. FIG. 11 illustrates an example of an interconnection between shaft 49 and shoe 54, according to the invention, which isolates the filter cartridges and gaskets from the application of such torque. The outer end 51 of shaft 49 has an annular groove 57 and the inner surface of the rotating shoe 54 has an annular groove 59, which together receive a C-clip 58 that attaches the rotatable shoe to the shaft end for axial movement, but permits free rotation of the shoe relative to the shaft. A clearance space 55 may be present between the inner end of rotatable shoe 54 and the outer tip of shaft end 51 to minimize friction therebetween and assist in allowing shoe 54 to freely rotate about the shaft 49, which prevents the transmission of torque from shaft 49 to clamping disc 46. Any number of different methods may be used to attach rotatable shoe 54 to shaft 49 as long as shoe 54 is allowed to freely rotate about the shaft end 51.

What is claimed is:

1. A support system for a horizontally mounted filter cartridge dust collector, said support system comprising:
   a housing having a dirty air plenum for receiving air to be filtered and a clean air plenum for conducting filtered air to exhaust, said plenums being separated by an internal partition;
   a plurality of generally vertical supports coupled to said housing in said dirty plenum and disposed in spaced positions distal from said partition;
   a plurality of spaced, generally horizontal supports, each having a first end connected to one of the vertical supports and a second end connected to said partition for receiving and supporting rows of multiple filter cartridges disposed one behind the other; and
   a single access opening in said housing having a door mounted to said housing for providing access through said single opening to the entire dirty air plenum when said door is in its open position.

2. The support system of claim 1 wherein said internal partition includes projections alignable with corresponding recesses in filter cartridges disposed adjacent the partition to locate such cartridges in a predetermined horizontal and vertical position.

3. The support system of claim 2 further comprising clamping mechanisms supported by said generally vertical supports for axially compressing each row of filter cartridges and positioning the projections inside the corresponding recesses to fix the predetermined horizontal and vertical position of each cartridge.

4. The support system of claim 3 wherein said clamping mechanisms include:
   means for receiving a rotational force;
   means for converting the rotational force into linear movement that axially compresses the filter cartridges; and
   means for isolating the filter cartridges from the torque being applied to the clamping mechanisms.

5. A filter cartridge dust collector comprising:
   a housing having a dirty air plenum for receiving air to be filtered and a clean air plenum for conducting filtered air to exhaust, said plenums being separated by an internal partition;
   a plurality of generally vertical supports coupled to said housing in said dirty air plenum and disposed in spaced positions distal from said partition;
   a plurality of spaced, generally horizontal supports, each having a first end connected to one of the vertical supports and a second end connected to said partition for receiving and supporting a plurality of filter cartridges;
   a plurality of filter cartridges supported in predetermined positions by said generally horizontal supports; and
   a single access opening in said housing having a door mounted to said housing for providing access through said single opening to all of the cartridges and the entire dirty air plenum when said door is in its open position.

6. The dust collector of claim 5 wherein said horizontal supports are arranged to support at least one row of said cartridges, said at least one row including multiple cartridges disposed in-line one behind the other with said multiple cartridges resting between and on said horizontal supports.

7. The dust collector of claim 5 wherein said internal partition includes at least one projection extending into the dirty air plenum and at least one of said cartridges includes a recess matingly receiving said at least one projection, thereby locating said at least one cartridge in a predetermined horizontal and vertical position.

8. The dust collector of claim 7 further comprising a clamping mechanism supported by said generally vertical supports and axially compressing said at least one filter cartridge such that said projection is forced into said recess and the predetermined horizontal and vertical position of said at least one cartridge is fixed.

9. The dust collector of claim 6 wherein said at least one row of multiple in-line filter cartridges comprises an inner cartridge disposed adjacent the internal partition and an outer cartridge disposed adjacent the single access opening, with each of the inner and outer cartridges including opposed ends having inner and outer openings communicating with the interior of the cartridges, and wherein said partition includes an opening in communication with the interior of the cartridges and said clear air plenum.

10. The dust collector of claim 9 wherein each row of filter cartridges further comprises:
    an inner gasket disposed between the opening in said partition and the inner cartridge for sealing the opening in said partition and the inner opening of the inner cartridge;
    a middle gasket disposed between the inner and outer cartridges for sealing the outer opening of the inner cartridge and the inner opening of the outer cartridge; and
    a clamping mechanism supported by the housing and including a clamping disc and an outer gasket disposed between the disc and the outer cartridge for sealing the outer opening of the outer cartridge, said clamping mechanism being operable to axially compress together the clamping disc, outer gasket, outer cartridge, middle gasket, inner cartridge, and inner gasket against the partition to seal the openings in the partition and cartridges, and thereby isolate the dirty and clean air plenums.

11. The dust collector of claim 6 wherein said housing includes an air inlet communicating with said dirty air plenum and further comprising a first set of air vanes disposed in said dirty air plenum and supported by said housing in a position directing and distributing air flow conducted into said inlet over the length of the cartridges.

12. The dust collector of claim 11 further comprising a second set of air vanes disposed in said dirty air plenum and supported by said housing in a position upstream of said filter cartridges for directing air flow distributed by said first set of air vanes laterally over the width of the cartridges.

13. The dust collector of claim 12 wherein said vertical and horizontal supports define at least one bank of cartridge supports arranged in a column having at least an upper and lower row of cartridges, with at least two cartridges provided in each row, and wherein said second set of air vanes comprises an inverted V-shaped plate extending between the vertical supports and the internal partition, said V-shaped plate being disposed above the upper row of cartridges for directing air around a top side of the upper row of cartridges.

14. The dust collector of claim 13 wherein said first set of air vanes comprises a plurality of flat plates disposed in positions spaced along the length of the cartridges, said flat plates having progressively increasing heights along the direction of air flow into the dirty air plenum.

15. The dust collector of claim 12 further comprising an air outlet communicating with said clean air plenum, whereby during operation of the dust collector air to be filtered flows from the air inlet into said dirty air plenum where it is distributed along the length of the cartridges by said first set of air vanes, diverted around the top side of the upper row of cartridges by said second set of air vanes, filtered as it flows through the cartridges into the interior thereof, and is conducted via the openings in the internal partition into the clean air plenum where it leaves the collector via the air outlet.

16. The dust collector of claim 15 wherein said vertical and horizontal supports define at lest two banks of cartridges supports, each bank being arranged in a column having at least an upper and lower row of filter cartridges, with a second set of air vanes being provided for each bank, and wherein said first set of air vanes extend across the width of both banks.

17. The dust collector of claim 5 further comprising a clamping mechanism supported by said housing and being operable in response to a rotational force to axially compress said filter cartridges against said internal partition without applying torque to the filter cartridges.

18. The dust collector of claim 17 wherein said clamping mechanism includes:
    means for receiving a rotational force;
    means for converting the rotational force into linear movement to axially compress said filter cartridges; and
    means for isolating the filter cartridges from the torque being applied to the clamping mechanism.

19. The dust collector of claim 18 wherein said internal partition includes at least one projection extending into the dirty air plenum and at least one of said filter cartridges includes a recess matingly receiving said at least one projection when the clamping mechanism is operated to compress and fixedly locate the horizontal and vertical position of the cartridges.

20. The dust collector of claim 17 wherein said clamping mechanism comprises:
    a clamping disc positioned adjacent an outer open end of at least one of said cartridge filters for compressing the outer end of the cartridge;
    a first gasket disposed between the clamping disc and the open outer end of the cartridge for sealing said open outer end;
    a bracket fixedly attached to said clamping disc and having a hole therein;
    a clamping bar fixedly attached between two of said vertical supports and having a threaded hole therein, said clamping bar being located between said clamping disc and said bracket such that the hole in the bracket is aligned with the threaded hole;
    a threaded shaft extending through the hole in said bracket and being received in said threaded hole; and
    an axial force-transmitting member mounted on an end of the shaft for rotation relative thereto wherein said shaft is rotatable to adjust its axial position relative to the clamping bar to force the forcetransmitting member against the clamping disc to compress and seal the outer end of the cartridge.

* * * * *